June 24, 1930.    C. E. THOMPSON ET AL    1,767,415
METHOD OF MAKING POPPET VALVES
Filed Nov. 12, 1928
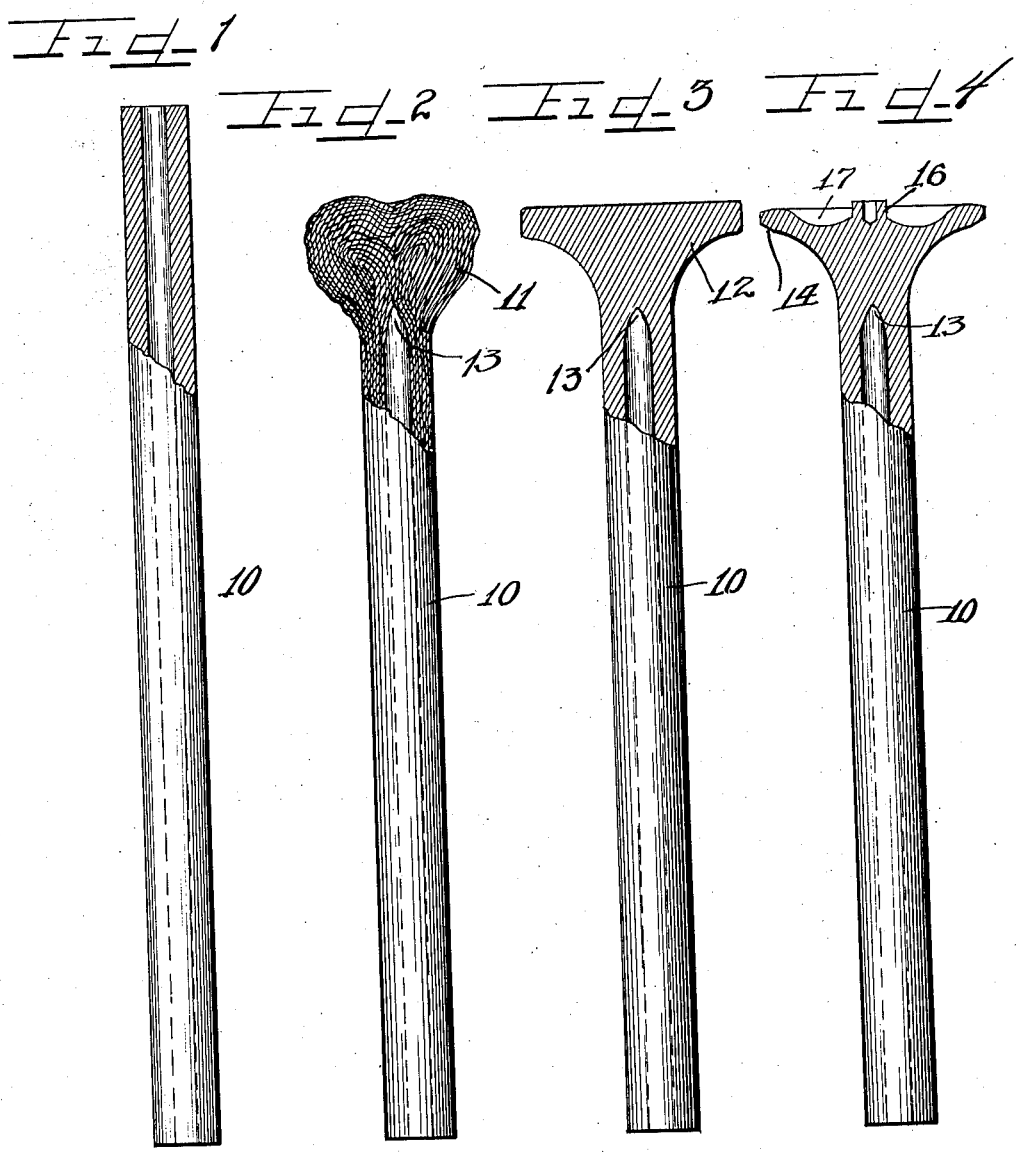
Inventors
Charles E. Thompson
Richard E. Bissett
by Charles H. Hills Attys.

Patented June 24, 1930

1,767,415

UNITED STATES PATENT OFFICE

CHARLES E. THOMPSON AND RICHARD E. BISSELL, OF CLEVELAND, OHIO, ASSIGNORS TO THOMPSON PRODUCTS INC., OF CLEVELAND, OHIO, A CORPORATION OF OHIO

METHOD OF MAKING POPPET VALVES

Application filed November 12, 1928. Serial No. 318,752.

This invention relates to the method of making poppet valves for internal combustion engines and has special reference to the formation of such valves from tubing whereby the finished valve will have a tubular stem merging gradually into an integral solid head.

It is an object of this invention to provide an economically manufactured hollow stemmed poppet valve wherein the valve head is formed on a length of tubing by upsetting one end thereof to produce a sufficient volume of metal to form the finished valve head. We are aware that drilled and salt filled stems have been used heretofore in high duty valves for internal combustion engines, but such valves are very expensive to manufacture and their use is only justified where extreme operating conditions require the best regardless of cost. The present invention involves the production of a valve having a tubular stem at a cost only slightly, if any, more than the cost of a solid stem valve if made of the same material, while the hollow stem valve, due to the increased surface area thereof in contact with the cool valve guide, as well as the stream line connection without sudden change in section between the stem and head, is sufficient to reduce the head temperature of the valve to a great degree, and in connection with proper valve guides, to a degree sufficient to allow the use of cheaper materials not normally considered non-scaling at motor temperatures, but which at these reduced temperatures are entirely satisfactory and cheaper in cost than solid stemmed valves of more expensive material.

It is also an object of this invention to produce a hollow stemmed valve wherein the central opening tapers gradually into a point at the neck joining the stem to the head, thus producing a stream line section without sudden change in section so that the stem merges gradually into the neck and head, eliminating sudden changes in stress due to unequal section areas. Such a gradual merging of section is of course, impractical to obtain either with a drilled stem or a head welded upon a tubular stem.

Other and further important objects of this invention will be apparent from the disclosures in the specification and the accompanying drawings.

This invention (in a preferred form) is illustrated in the drawings and hereinafter more fully described.

On the drawings:

Figure 1 is a view of a rod partly in section to show the tubular character thereof.

Figure 2 is a view partly in section of the rod of Figure 1 after the initial upsetting or head forming operation.

Figure 3 is a view partly in section of the rod of Figure 2 after the head is formed into shape by dies.

Figure 4 is a view partly in section of a completely machined valve formed from the forging of Figure 3.

As shown on the drawings:

A piece of seamless tubing 10 of the desired stem diameter and wall thickness is cut to a length sufficient to provide the necessary volume of metal for the valve head. The rod is then heated upset at one end to produce a pear shaped bulb of metal 11 of a volume sufficient to produce a rough valve head 12 as shown in Figure 3, the upsetting operation also closing the tube as indicated at 13 in Figure 2. One method of upsetting the tube is to use the process disclosed in the Guerne Patent No. 1,592,275, comprising clamping the tube in one electrode of an electric resistance upsetting machine and feeding the rod up against an upsetting die forming the second electrode, that portion of the tube between the electrodes being heated to a plastic condition by the flow of current therethrough. Another method of upsetting the metal is to repeatedly heat and forge or upset the tube until the required volume is obtained.

The tube and bulb like head 11 shown in Figure 2, is then placed between forming dies which produce the rough forged head 12 shown in Figure 3. The forged head 12 is then machined to produce the valve seating surface 14 and the top of the head is provided with a centering boss 16 and is also cut back somewhat as indicated at 17 to lighten and reduce the heat absorbing qualities of the head.

The upsetting operation previously referred to is preferably done slowly while maintaining the tube end in a plastic state in order that the closing up of the central aperture in the tube will be gradual and taper to a point as indicated at 13. This gradual merging of the tube into the solid head is especially advantageous in eliminating localized stresses due to sudden changes in section and assists in the heat transfer from the head to the tubular stem.

It will thus be seen that we have produced a tubular stemmed valve that can be economically manufactured in competition with solid stemmed valves and that the valve of this invention will operate at a substantially lower temperature and be lighter in weight compared to an equivalent solid valve.

We are aware that many changes may be made, and numerous details of construction may be varied through a wide range without departing from the principles of this invention, and we therefore do not purpose limiting the patent granted hereon, otherwise than necessitated by the prior art.

We claim as our invention:

1. In a method of forming hollow stemmed valves having solid heads, the step of upsetting one end of a seamless tube to close said end and form thereon a solid bulb of metal.

2. In a method of forming hollow stemmed valves having solid heads, the step of upsetting one end of a seamless tube to close said end and form thereon a metallic bulb, the upsetting operation being so performed as to cause a gradual merging of said bulb into the wall of said tube.

3. A method of forming hollow stemmed valves having solid heads, which comprises upsetting one end of a hollow rod to close the end of the rod and form a solid enlargement thereon, and machining the enlargement to the shape of a valve head.

4. A method of forming poppet valves which comprises slowly upsetting one end of a seamless tube to form thereon a solid bulb gradually merging into the wall of said tube and machining the bulb to the shape of a valve head.

In testimony whereof, we have hereunto subscribed our names at Cleveland, Cuyahoga County, Ohio.

CHARLES E. THOMPSON.
RICHARD E. BISSELL.